INVENTOR.
RICHARD A. BRANHAM
BY William M. Holday
ATTORNEY

INVENTOR.
RICHARD A. BRANHAM
BY William M. Hobby
ATTORNEY

Aug. 4, 1970 R. A. BRANHAM 3,523,250

TIME DIVISION MULTIPLEX MULTIPLE FREQUENCY DIVERSITY TROPOSCATTER COMMUNICATION SYSTEM

Filed Feb. 21, 1967 7 Sheets-Sheet 3

INVENTOR.

BY RICHARD A. BRANHAM

William M. Hobby

ATTORNEY

INVENTOR.
RICHARD A. BRANHAM
BY William M. Hobby
ATTORNEY

INVENTOR.
BY RICHARD A. BRANHAM
William M. Hobby
ATTORNEY

INVENTOR.
RICHARD A. BRANHAM
BY William M. Hobby
ATTORNEY

Aug. 4, 1970 R. A. BRANHAM 3,523,250

TIME DIVISION MULTIPLEX MULTIPLE FREQUENCY DIVERSITY TROPOSCATTER COMMUNICATION SYSTEM

Filed Feb. 21, 1967 7 Sheets-Sheet 7

INVENTOR.

RICHARD A. BRANHAM

BY William M. Hobby

ATTORNEY

United States Patent Office 3,523,250

Patented Aug. 4, 1970

3,523,250

TIME DIVISION MULTIPLEX MULTIPLE FREQUENCY DIVERSITY TROPOSCATTER COMMUNICATION SYSTEM

Richard A. Branham, Orange County, Fla., assignor to Martin-Marietta Corporation, New York, N.Y., a corporation of Maryland Filed Feb. 21, 1967, Ser. No. 617,596
Int. Cl. H04b 7/02
U.S. Cl. 325—56 32 Claims

ABSTRACT OF THE DISCLOSURE

This invention involves a scatter propagation communication system for the transmission and reception of intelligence bearing signals over a tropospheric scatter medium. Two digital coding techniques are utilized. Voice and data channels are encoded into a serial binary bit stream of time-division multiplexed pulse code modulated signals, and then the serial binary bit stream is converted into a serial stream of frequency-time codes which are transmitted over a troposcatter link by means of a single antenna and power amplifier.

CROSS-REFERENCE TO RELATED APPLICATION

This invention is related to Pat. No. 3,226,644 which issued Dec. 28, 1965 to McKay Goode and Macdonald J. Wiggins for "Tropospheric Scatter Communication System Having High Diversity Gain" and assigned to the assignee of the present invention. Certain features of the present invention are set out in more detail in their patent and reference may be had thereto for a better understanding of prior art, as well as my improvements over the prior art.

BACKGROUND OF THE INVENTION

This invention relates to a scatter propagation communication sytem and more particularly to a time division, multiple frequency diversity communication system for beyond-the-horizon communication utilizing scatter propagation in the tropospheric mode.

Troposcatter is the term used to describe the scattering of radiowaves from the troposphere. While the word scatter implies that the spreading is equally probable in all directions, the scattering from the troposphere occurs mainly in the forward direction and is sometimes referred to as forward scatter. The exact reasons which cause this scatter effect are not yet known but most of the several theories fit into one of two schools of thought. One is that the scattering is caused by blobs of air in the atmosphere, while the other supports the belief that scattering occurs from layers in the troposphere. At any rate, troposcatter propagation is affected by the physical characteristics of the troposphere.

The troposphere is not a stable area for communications and the signal intensities tend to fade over a wide range with the signals dropping below usable values at times. This fading may be caused by multiple reflections from the troposphere which cause two or more waves to arrive over different paths of different lengths and which differ in phase and amplitude. These waves, all from the same transmitter, do not differ in frequency but may change rapidly in phase from moment to moment as the relative path lengths change. This difference may cause random cancellations or additions in the receiver. Thus the fading characteristics will differ at locations separated by only a moderate distance, sometimes to the extent that there may be little or no instant-to-instant correlation.

One of the best means for reducing fading is called diversity reception which is obtained by receiving multiple signals, of uncorrelated fading characteristics and either combining and/or selecting two or more of the signals to produce the usable signal. The use of diversity techniques for troposcatter communication systems has become essentially standard due to the large fast fading characteristics of the medium. Several techniques are used in diversity systems, the most common of which is probably space diversity whereby from a multiplicity of receivers at separated locations at least one of them at a time may receive a usable signal while for the others the signal may be unusable. In other words, if the antenna locations are duplicated in different locations, and the outputs are all available to choose from the circuit reliability will be improved. This technique is considered unsuitable for a tactical system due to size and weight of the multiple antenna system, and because a complete receiver is required for each antenna.

Another technique that may be used is called frequency diversity in which the signal is transmitted simultaneously on several frequencies sufficiently separated so that their fading characteristics are independent. Conventionally, this has been accomplished by using multiple transmitters and receivers with a single antenna at each terminal. It has also been used to provide additional diversity with two antennas by combining with space diversity.

The present invention utilizes a technique of frequency diversity requiring only a single antenna, transmitter and receiver by the use of frequency-time (F–T) codes. F–T coding is utilized in which each transmitted code word consists of a matrix of several different frequencies transmitted in short bursts in several successive time positions. The order of transmission of the frequencies is varied for each word and within a given word only one frequency is permitted to occupy a time slot and no frequency is repeated during a single F–T code. The purpose of the F–T codes are two fold, they must carry the intelligence to be transmitted and they must provide the frequency diversity simultaneously.

The present invention is a new, light weight troposcatter communication system which combines two digital coding devices. First a time division multiplex pulse code modulator or the like serves to encode voice and data channels into a serial binary bit stream for transmission and then a multiple frequency diversity section converts the serial binary bit stream into a serial stream of frequency-time codes which are transmitted over a troposcatter link by means of a single power amplifier and antenna. This combination results in a system that has all the advantages of a time division multiplexed pulse code modulation voice and data as well as the advantages of the newly developed frequency-time coding in the multiple frequency diversity section. The system advantageously has no crosstalk since time division multiplex is used to transmit the individual channels while obtaining multiple order diversity with a single antenna and transmitter, thus eliminating the need for a costly duplicate set of radio or frequency equipment at each terminal. A novel set of frequency-time codes are advantageously used to transmit one and only one frequency at a time resulting in a high radio frequency power amplifier duty cycle which approaches unity without power splitting or intermodulation distortion. Additional advantages of the present system include a capability of transmitting both voice and data at the same time without special additional equipment and since the system is digital most of the circuitry can be produced in an integrated circuit package, reducing size and weight while enhancing reliability. Also, no external voice channel multiplexing is required since this function is performed digitally with the present system.

BRIEF DESCRIPTION OF THE DRAWINGS

Other objects, features, and advantages of this invention will be apparent from a study of the written description and the drawings in which.

DESCRIPTION OF THE PREFERRED EMBODIMENTS

Figure 1:
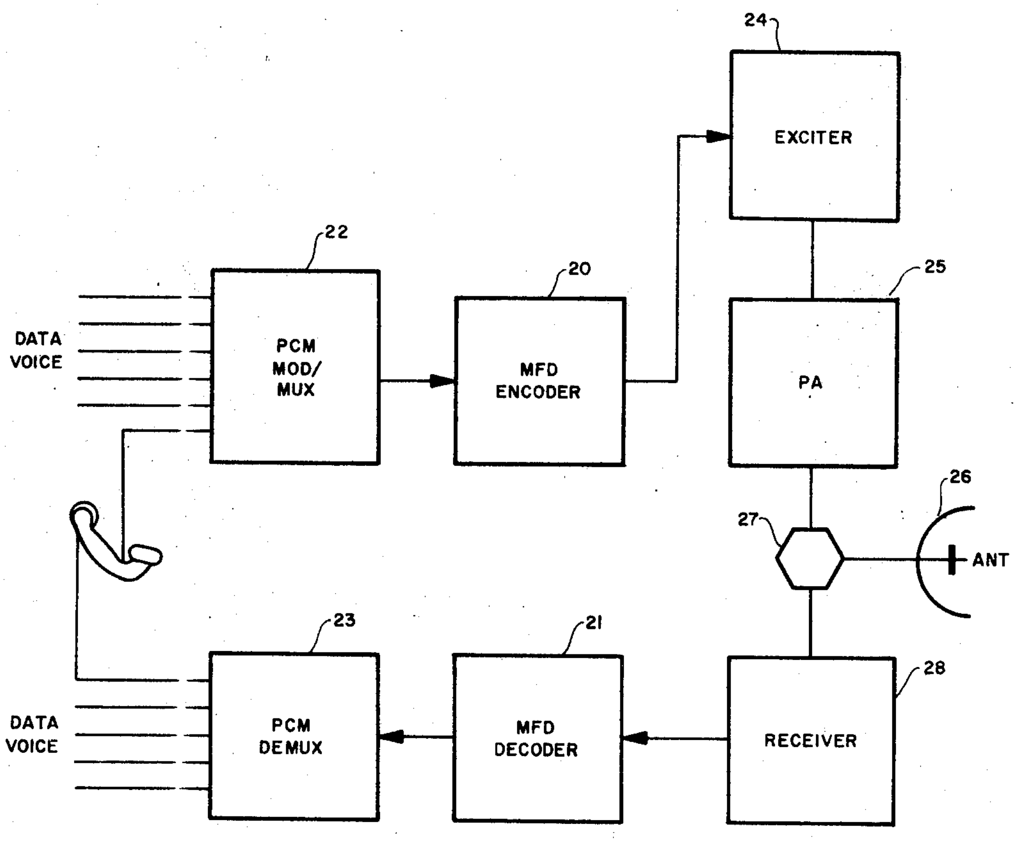
FIG. 1 is a simplified block diagram of the present invention.

Referring to FIG. 1, an overall block diagram of the present system is shown to consist primarily of two separate entities, a multiple frequency diversity section, including encoder 20 and decoder 21 and a pulse code modulator/multiplexer 22-demultiplexer 23 section. The multiple frequency diversity encoder 20 is capable of converting a serial binary bit stream into a serial stream of frequency-time codes for transmission at high rates over a troposcatter path. The pulse code modulator/multiplexer encoder 22 samples each voice and data channel periodically and sequentially, and produces a serial binary bit stream for conversion to a frequency time stream by the multiple frequency diversity section. At the receiving terminal a pulse code demultiplexer/demodulator 23 decodes all audio and data channels in proper sequence. An exciter 24 generates the carrier frequencies of the transmitter prior to amplification by the power amplifier 25. Signals are transmitted and received by a single antenna 26 through a diplexer and filter 27 which permits simultaneous reception and transmission.

Figure 2:
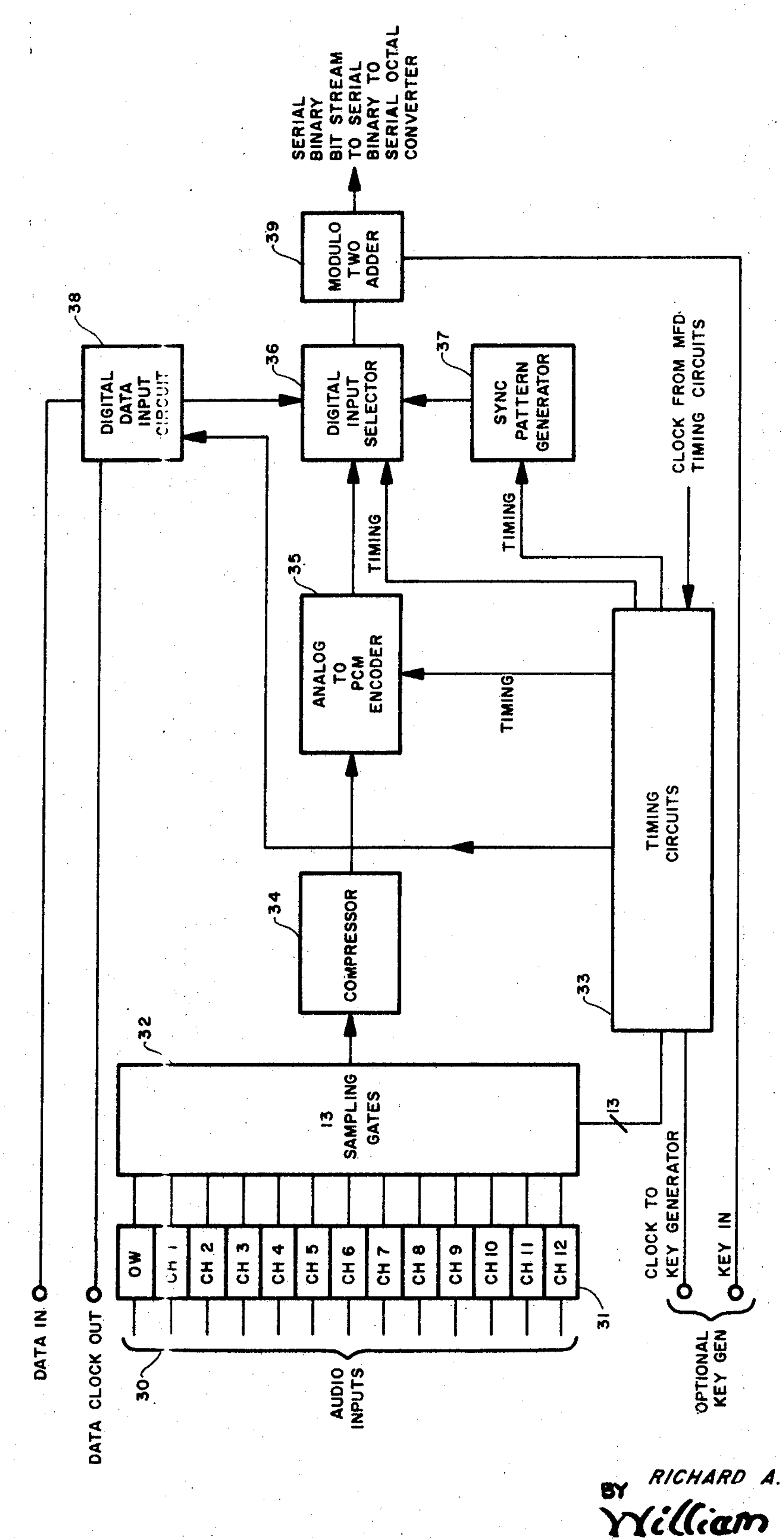
FIG. 2 is a block diagram of the Pulse Code Modulation Time Division Multiplexer used in the embodiment of FIG. 1.

FIG. 2 shows a block diagram of an embodiment of the pulse code modulator/multiplexer section 22 (FIG. 1) of the present invention which is generally of conventional design and purpose. Its function is to convert all signals to be transmitted into pulse code modulation and time division multiplex. Audio signals are fed through the inputs 30 to the audio amplifiers and filters 31 which includes operational amplifiers used to obtain gain in the input signals and to provide filtering. Filtering is desirable at this point to prevent any undesirable interaction between the sampling frequency and any audio signal.

The outputs of the audio amplifiers and filters 31 are impinged on sampling gates 32. The gates 32 are sampled in sequence through control logic from the timing circuits 33. Channel one is sampled first and an analog of the audio sample is sent through a logarithmic compressor 34 and encoded into PCM by the analog to PCM encoder 35 prior to channel two being sampled for audio level. The sampling is done by uniform sampling and in sequence, channel 1, 2, 3, . . . , 11, 12, order wire and repeat.

Sampling gates 32 are very simple circuits and may consist of a very fast field effect transistor for each gate 32 with their outputs all connected in parallel and their sources connected to the outputs of the input amplifiers and filters 31. The gates 32 are also connected to the PCM encoder timing circuits 33 which are the source of the sampling pulses.

The PCM multiplexing equipment contains a circuit 34 for instantaneous compression of the audio signals. This compression is the transmitting part of a compander system which has been found to improve the signal to noise ratio in quantized systems. A compander circuit consists of a compressor such as 34 in the input of the transmission and an expander in the output of the transmission with an inverse operation on the receiving end of the system. The compressor 34 performs an instantaneous operation which may be seen as a voltage preemphasis of signals near zero and a voltage deemphasis of signals near maximum which renders all quantum levels equally probable in order to obtain an approximately rectangular distribution of PCM words.

The analog to PCM encoder 35 converts the input amplitude samples of speech from the compressor 34 into binary PCM words. It is a logic circuit commonly known as a successive approximation encoder. The amplitude samples of the audio from all channels appear at the input in a time division multiplexed sequence. Each audio sample is then encoded so that the resulting binary word represents the sampled audio voltage and the output from the encoder is a continuous bit stream which represents quantized values of the audio samples that appeared at the inputs.

Digital input selector 36 is a logic selector circuit made up of conventional logic, controlled by the PCM encoder timing circuits 33 which permits any of the voice channels to be preempted for data. It also sends the frame sync pattern in lieu of the order wire PCM code every fourth sample period. For instance, if a channel were preempted for data use, instead of sending the coded word during the time that such a channel would formally be encoded, the digital input selector 36 merely switches over to the data input circuits and sends the appropriate ones or zeros depending on whether the data to be sent was a one or zero at the last data sample time.

The sync pattern generator 37 is combination of logic gates controlled by the PCM encoder timing circuits 33 which blocks every fourth order wire code word and transmits the sync pattern instead. This sync pattern is used in the PCM time division demultiplexer for establishing frame sync (correct time division demultiplexing) and determining if a frame sync cycle is necessary. Ordinarily, frame sync is superfluous once established since bit sync can hold all orders of synchronization. The frame sync pattern could be withdrawn from the system operation after establishment with no ill effects unless a rare, but possible momentary power outage were to cause a skip in the multiplexing logic. Therefore it is still desirable to send the sync information so that the frame sync is always reestablished automatically if lost for any reason.

The digital data input circuit 38 is made up of a level shifter and buffer storage, and is used in the present system to change the input data from any standard format to one that will operate with the internal logic language and for momentary storage after the data is sampled as to whether its state is one or zero at the beginning of the order wire sample time. The data is transmitted later at its proper time in the multiplexing sequence.

The final circuit in the PCM time division multiplexer is a modulo two adder or half adder circuit 39 which provides the capability of adding secure or private communications to the system without future modification. Connectors are provided to circuits for an external binary key generator and an exit for clock pulses to the key generator. The key is added with the modulo two adder 39 to the incoming binary bit stream, thereby producing a coded bit stream. The decoding circuits in the PCM demultiplexer of the receiving section must contain a similar half adder, and a similar key to add to the decoded bit stream, thereby returning it to its original form. To place the circuit in operation all that is necessary is to add a key generator and to stop the circuit all that need be done is to remove the key generators, for the circuit operates normally when no key is inserted.

Figure 3:
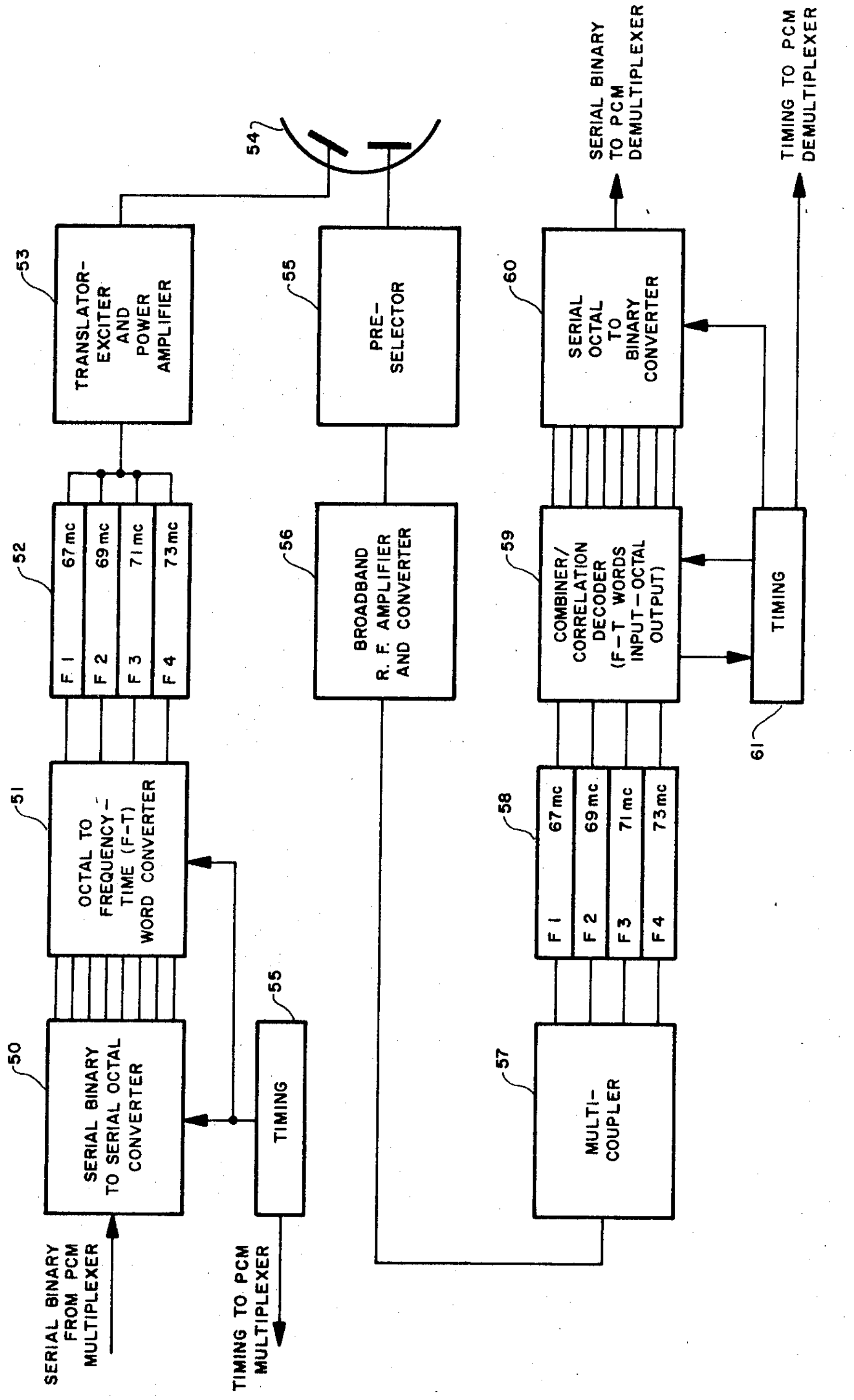
FIG. 3 is a block diagram of the Multiple Frequency Diversity section of FIG. 1.

Turning now to FIG. 3 there is shown a block diagram of the multiple frequency diversity section of the present invention whose function is to transmit an input serial bit stream from the Pulse Code Modulator/Multiplexer (PCM/MUX) 22 (FIG. 1) over the troposcatter path and to reestablish the same serial bit stream at the receiving site for demultiplexing to individual channels. The transmitting circuits first convert the incoming binary bit stream into *m*-ary (such as 4, 8 or 16-ary) codes in the serial binary serial *m*-ary converter 50. In the present case, serial *m*-ary is illustrated by serial octal where *m* is equal to 8, but it should be clear that other *m*-ary codes may also be used within the scope of the invention. The *m*-ary codes are converted into frequency-time codes in the octal to frequency-time word converter 51 which causes the gated oscillators 52 to produce frequency-time codes which are transmitted over the troposcatter path via the exciter and power amplifier 53 and antennas 54. At the receiving site, the reverse process takes place. The Frequency-Time (F–T) codes are received and converted back to the *m*-ary codes and then back to a binary bit stream to be shifted out continuously to the Pulse Code Modulation demultiplexing equipment 23 (FIG. 1).

The purpose of the serial binary to serial octal converter 50 is to examine the output serial bit stream from the PCM time division multiplexer and convert every three successive bits into octal codes. The code conversion is done with a three stage shift register and a cross connection matrix feeding conventional 3-input AND gates. The outputs are a logic "1" on one of eight wires for every three input bits. These signals are then sent to the serial octal to frequency-time word converter 51 for converting to frequency-time words in the form of gating signals which will be used by the set of gated oscillators 52 to produce the actual F–T words for translation to the carrier frequency and transmission by the radio set. Serial octal to frequency-time word converter 51 accomplishes its purpose by the use of a cross connection matrix connecting the inputs to gating logic circuits. Gating pulses from the octal to F–T word converter 51 actuate the gates of the gated oscillators 52 to generate four time-gated R.F. signals. Each set of four R.F. bursts represents one frequency-time word. Thus one F–T word represents three digital bits from the PCM Multiplexer 22 FIG. 1. These F–T words are then converted through a four input multicoupler to the exciter and power amplifier 53 and then to antenna 54 for transmission over the troposcatter communication path.

In the receiver section of the system signals are received at antenna 54 and fed to the preselector 55. Preselector 55 is placed ahead of the preamplifier and converter 56 and passes signals of desired frequencies while reducing others. Preamplification and discrimination is performed by the broadband R.F. amplifier and converter 56. A broadband preamplifier allows all frequencies of the frequency-time words to be amplified in the same preamplifier prior to multicoupler 57 coupling each frequency to separate IF amplifier 58. Each IF amplifier 58–F1, F2, F3 and F4 amplifies the incoming pulse data stream associated with its center frequency and also has the receiver video detector located therein.

The combiner/correlation decoder 59 receives and processes all the video from the IF amplifiers in such a manner that the elements of the F–T words are combined simultaneously. At the end of each word, the combinging that has the highest energy is selected as most likely the word that was transmitted. The selected word is subsequently converted into bits in an octal to serial binary converter 60 and then sent to the PCM time division demultiplexer. The combiner/correlation decoder is discussed in more detail hereinafter in connection with FIG. 6. Timing pulses for the F–T timing are generated by the F–T decoder timing circuits 61 and may be accomplished with a four stage ring counter.

The final step in reconstruction of the original binary bit stream is performed by the serial octal to binary converter 60 which is composed of conventional logic elements which encode shift registers at the end of each F–T frame by means of a cross connection matrix, the binary bits are then shifted out serially. The shifting process is continuous so that the output bit stream is the same as the transmitted bit stream while the code conversion itself occurs in parallel at the end of each F–T word.

Figure 4:
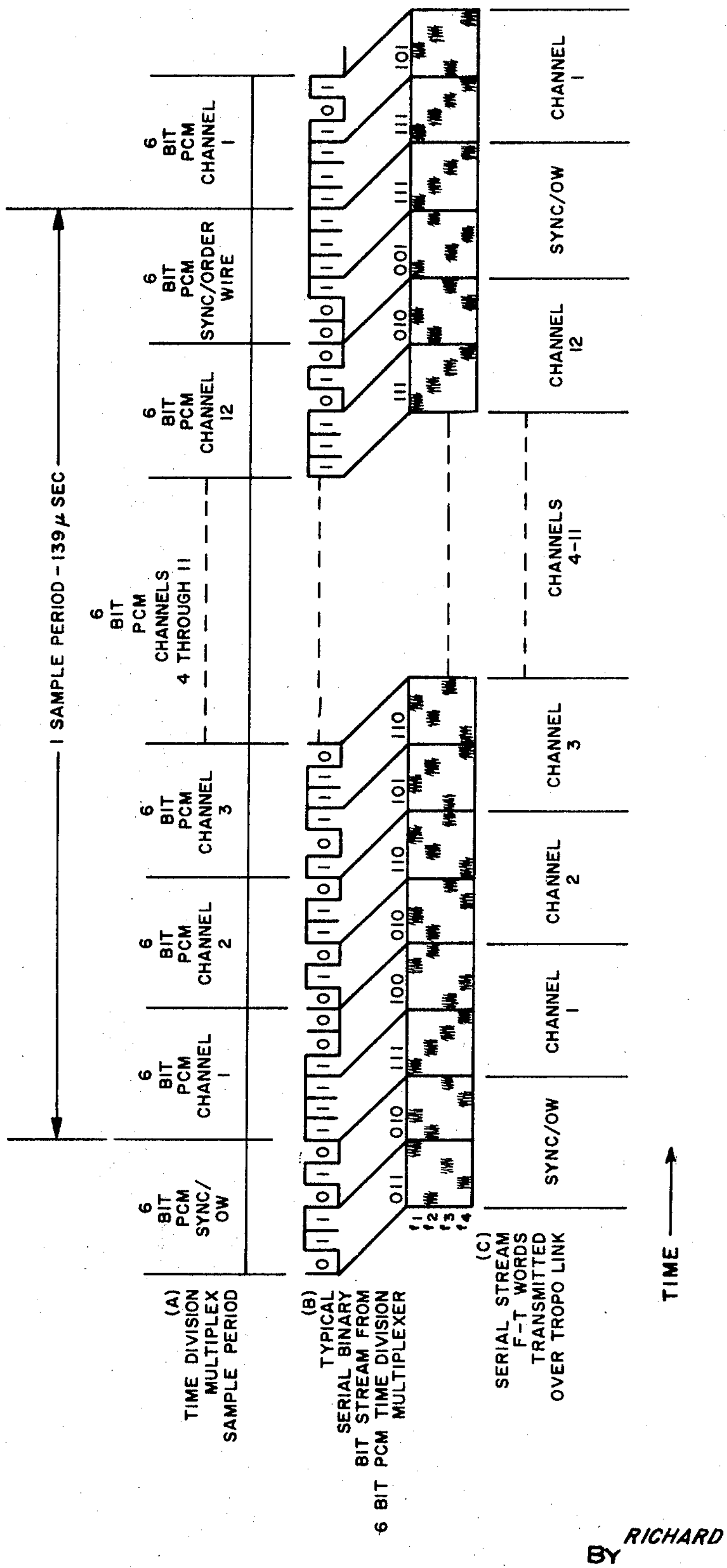
FIG. 4 illustrates conversion of a typical Serial Binary Bit Stream to a Serial Stream of Frequency-Time words as transmitted over a troposcatter link.

FIG. 4 illustrates a typical mapping of a serial digital bit stream, line B, into a serial stream of frequency-time code words, line C, as a function of time. Line A is included for additional information to illustrate a typical time division multiplexing arrangement which results in the serial digital bit stream, line B, from the PCM MOD/MUX 22 of FIG. 1.

In FIG. 4, a significant illustration is the relationship of line B to line C. It is shown in the example that the data stream of B is converted (or mapped) into F–T codes in data bytes of three bits for each byte. The F–T codes are shown with line C time delayed with respect to line B to illustrate the fact that each F–T code is governed by the preceding data byte. In each F–T code shown there are four darkened areas. These each indicate the time of occurrence of the frequency bursts that comprise the code. For example, the first F–T code of line C is formed by sending a burst sequence of $f_2$, $f_4$, $f_3$, $f_1$. This F–T code always represents the binary data byte of 011. The next F–T code immediately follows the first with a sequence of $f_2$, $f_1$, $f_4$, $f_3$ which represents the data byte of 010. This process is continuous in that an endless stream of digital input is mapped into an endless stream of F–T codes. It will be noted that after every four frequency bursts, comprising an F–T code, a solid line is shown merely to illustrate the end of each F–T code and the beginning of the next.

The F–T words carry the intelligence to be transmitted while providing frequency diversity. Advantageously, in this arrangement the transmitter transmits only one frequency at a time which permits transmitting each F–T element at the full peak power capability of the power capability of the power amplifier. On the other hand, transmission of more than one frequency at a time as was done in prior art, results in intermodulation distortion and power splitting by the transmitter power amplifier which degrades the overall system performance. Advantageously, there are also no time voids or blanks used in any of the F–T words. The use of time voids might provide additional codes but adds nothing at the receiver, while at the transmitter, reduced duty cycle might be obtained, but if a glystron or beam type power amplifier of the conventional type is used, the peak and average power are about the same level and hence no increase peak power is available.

No frequency is repeated during any F–T word, for such a repeat would not increase the redundancy of the word. Frequency diversity is advantageously obtained with F–T words because the words are redundant in both frequency and time so that several elements of the F–T words can be missing or severely faded at the receiver and the word can still be identified. Frequency-time words that share elements betwen words for the purpose of obtaining additional codes are permitted to share only one F–T element between any two words thus maintaining the lowest probability of error in decoding consistent with the number of F–T code words used.

The entire code, a portion of which is illustrated in FIG. 4, is given in Table I. Four frequencies and 6 bit PCM are used in this example. The order of the frequency of course determines the codeword. This particular code scheme was chosen to enhance performance in a fading environment. As can be seen from Table I and FIG. 4 each frequency is assigned a symbol and the order of transmission of the four frequencies determines the actual F–T codeword and its binary equivalent.

TABLE I

| Symbol: | Frequency |
|---|---|
| 1 | $F_1$ |
| 2 | $F_2$ |
| 3 | $F_3$ |
| 4 | $F_4$ |

| Three successive binary bits: | Corresponding F–T codeword |
|---|---|
| 000 | [1] 4321 |
| 001 | 1342 |
| 010 | 2143 |
| 011 | 2431 |
| 100 | 3412 |
| 101 | 3124 |
| 110 | 4213 |
| 111 | 1234 |

[1] $(F_{4,3,2,1})$.

Diversity is obtained through the frequency spectrum, as the frequencies may be spaced at intervals greater than the correlation bandwidth for troposcatter paths. A spacing of two megacycles is usually sufficient. The digital intelligence is carried by means of the frequency variance routine of each four slot word. The words can be correctly recognized at the receiver with any two elements completely missing and a third element faded severely. Thus, F–T words are ideal for communications through fading media, such as troposcatter, which is characterized by uncorrelated fading among frequencies spaced apart.

Figure 5:
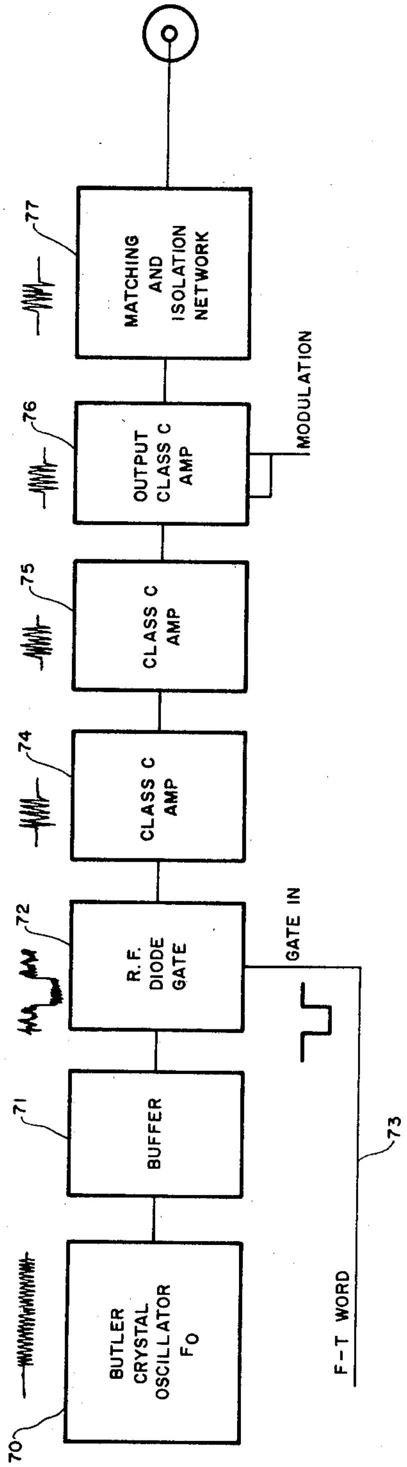
FIG. 5 shows a block diagram of one of the Gated Oscillators of FIG. 3.

Referring to FIG. 5, there is shown a block diagram of one gated oscillator as used in oscillators 52 of FIG. 3. The gated oscillators are used to generate the R.F. signals representing frequency-time words. Each gated oscillator may have a crystal controlled butler oscillator 70 as a frequency source. A buffer amplifier stage 71 provides isolation between the crystal oscillator 70 and the R.F. diode gate 72. The R.F. diode gate 72 is turned on by a grounding pulse from the serial octal to serial F–T word converter which is received on line 73. A gating of one frequency oscillator by a time slot generates one F–T element and four such successive time slots to each of the four gated oscillators generates a unique F–T word. Output Class C amplifiers 74, 75 and 76 produce amplification and are connected through a matching and isolation network 77 to a multicoupler and a common output.

Figure 6:
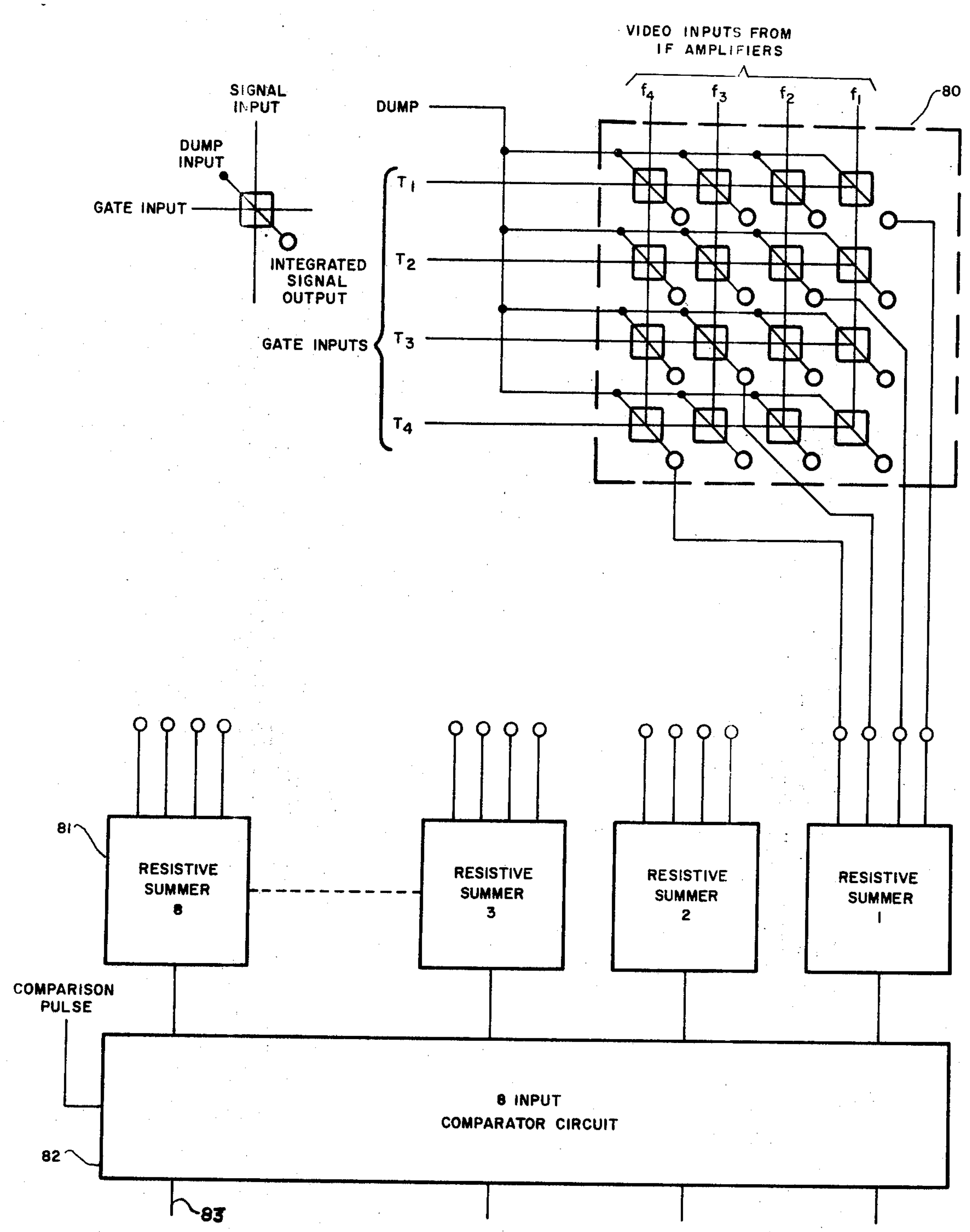
FIG. 6 shows a block diagram of a Combiner/Decoder that may be used in FIG. 3.

FIG. 6 illustrates one means of accomplishing the decoding operation of the combiner/decoder 59 of FIG. 3. The combiner/decoder consists of a matrix of gated integrators 80, eight resistive summers 81 and an 8 input comparator circuit 83 and is used to attempt to decode all possible F–T codes in a given format and select the F–T code that fits the received information best. In a four frequency-four time slot matrix of gated integrator there are sixteen possible F–T elements of signals over which integration can be taken. The signals at F1 can be integrated over time slot 1 or 2 or 3 or 4. Similarly, the same four integration intervals can be used for integration of the signals from the other three frequencies. Thus, sixteen F–T elements if properly combined can represent all possible F–T codes that can be generated by a four frequency-four slot F–T matrix. The integrated values of the F–T elements are stored within the circuits of the gated integrators 80 until the end of each F–T code word for the purpose of combining. The F–T code words are combined by summing the integrated values of their F–T elements. In this illustrated embodiment there are 8 F–T code words used in carrying the digital bit stream. In the combiner therefore there are eight summers 81 connected to the appropriate outputs of the gated integrator matrix 80. The output signal from each summer when measured at the end of the F–T code word is an analog of the total energy received for each F–T code word. The summer representing the most likely correct F–T code word is the one out of which the most energy was found at the end of the F–T code word. This is true since only one F–T code word at a time is radiated from the transmitter and only one F–T word should be received at the receiver. The outputs of the summers for which no F–T word was directed is merely the integrated values of the noise plus no more than one overlap element used in the encoding. In order to find the summer having the largest output, an 8 input differential comparator circuit 82 is used. Comparison circuit 82 effectively determines which code best fits the received F–T pattern. A logic "1" then appears at the output 83 of the comparator circuit at the end of each F–T word which is later converted to binary. This system is extendable to situations in which one F–T word stands for one plurality of bits; for example, 2 or 4, as well as three bits per word.

Figure 7:
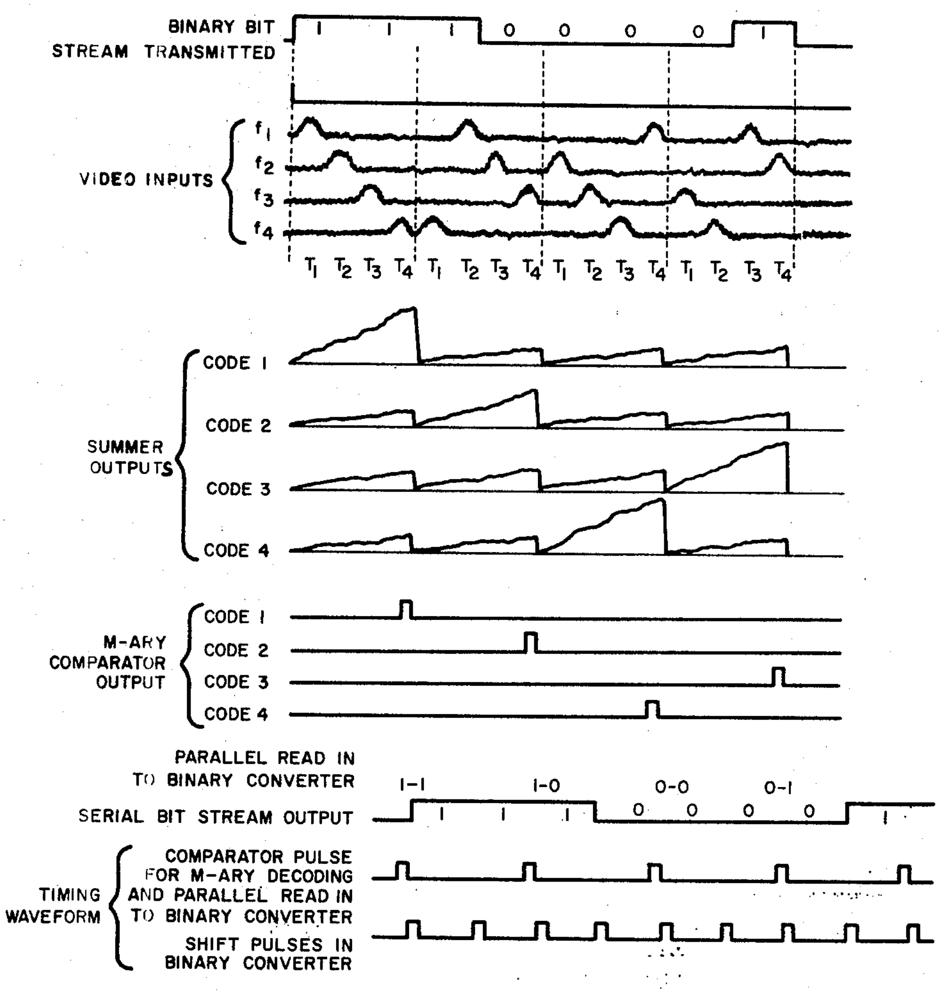
FIG. 7 illustrates Waveforms at different stages of the present system.

The waveforms of a decoded bit stream are shown in FIG. 7 and illustrate the sequence of events for a bit stream using 4-ary format in which each F–T word represents two successive binary bits. A small segment of the transmitted bit stream as would be issued by the pulse code modulator is indicated at the top as 11100001. The transmitter encodes the bit stream in the multiple frequency diversity section with one F–T code for each pair of binary bits which are illustrated as they would actually be received by the receiver with the addition of noise and distortion. Outputs of the four summers 81 of FIG. 6 are next illustrated (the remaining 4 summers of FIG. 6 are not used in the $m=4$ format). All the summers present an output, but the one which has signals present in the F–T elements will have a higher energy level than the other three that have integrated only noise. After every fourth time slot a comparison of the summer output is made, and the one with the largest amplitude is decoded in the binary converter. As illustrated, the binary converter recognizes the F–T codes that represent 1–1, 1–0, and 0–1 code in that order. Also illustrated are two timing waveforms, comparator pulses for $m$-ary decoding and parallel read into the binary converter 60 of FIG. 3, and also shift pulses in the binary converter.

From the foregoing description it will be clear that a communication system has been provided for communicating over the tropospheric scatter medium. The system as described has a wide range of applications, some of which have been described. It is to be understood that other variations are contemplated as being within the spirit of the invention. For instance, it is contemplated that other circuits than those described may be used as long as the overall format is maintained, and while PCM has been used in illustrating the present system, it should be understood that any coding method that produces a serial bit stream may be utilzed without departing from the spirit and scope of the invention.

This invention is not to be construed as limited to the particular forms disclosed herein, since these are to be regarded as illustrative rather than restrictive.

I claim:

1. A scatter propagation communication system for diversity type transmission and reception of radio frequency energy comprising in combination:

(a) pulse code modulation encoding and multplexing means for receiving and encoding analog signals into a time-division multiplexed serial binary bit stream.

(b) code converter means coupled to said pulse code modulation encoding and multiplexing means for converting said serial binary bit stream into a serial stream of redundant frequency-time codes consisting of a matrix of a plurality of short bursts of different frequencies in a plurality of successive time positions;

(c) transmission means coupled to said code converter means for the transmission of said redundant frequency-times codes over a troposcatter medium, said transmission means having a single power amplifier and a single antenna having a single feed system;

(d) receiver means for the reception of said transmitted frequency-time codes;

(e) decoder means coupled to said receiver means for converting said frequency-time codes to a serial binary bit stream; and (f) pulse code demodulation and demultiplexer means coupled to said decoder means for demodulating and demultiplexing said serial binary bit stream.

2. The communication system according to claim 1 in which said pulse code modulaiton encoding and multiplexing means includes means for receiving and multiplexing digital data.

3. The communication system according to claim 2 in which said code converter means converts said serial binary bit stream to an *m*-ary stream of redundant-times codes.

4. The communication system according to claim 3 in which said pulse code demodulation and demultiplexer means includes means for demultiplexing digital data.

5. The communication system according to claim 1 in which said decoder means identifies said redundant frequency-time codes by comparing all available codes and selecting the most likely F–T code.

6. The communication system according to claim 5 in which said decoder means selects the most likely frequency-time code by detecting the code elements of each code, summing the energies of said code elements, comparing the total energies of said summed code elements, and selecting the code having the greatest energy.

7. A method for beyond-the-horizon communication by means of scatter propagation in a tropospheric mode comprising the steps of:

(a) encoding intelligence bearing analog voltage signals into a serial binary bit stream of pulse code modulated signals;

(b) time-division multiplexing said serial binary bit stream into a plurality of channels;

(c) converting said time division multiplexed serial binary bit stream into redundant frequency-time coded signals consisting of a matrix of a plurality of short bursts of different frequencies in a plurality of successive time positions;

(d) transmitting said redundant frequency-time coded signals over a troposcatter communication link;

(e) receiving said transmitted redundant frequency-time coded signals;

(f) decoding said redundant frequency-time coded signals into a serial binary stream of pulse code modulated signals;

(g) demultiplexing said pulse code modulated signals into separate channels of pulse code modulated signals;

(h) demodulating said pulse code modulated signals into intelligence bearing signals.

8. The method according to claim 7 in which said step of converting said time-division multiplexed serial binary bit stream to redundant frequency-time coded signals, first converts said serial binary bit stream to a serial stream of redundant frequency-time codes.

9. The method according to claim 7 in which said step of decoding said redundant frequency-time coded signals into a serial binary bit stream first identifies said redundant frequency-time codes by comparing all available codes and selecting the most likely frequency-time code.

10. A scatter propagation communication system for diversity type transmission and reception of intelligence bearing radio frequency energy comprising:

(a) transmitting means for the transmission of radio frequency signals, said transmitting means being adapted to produce multiple order frequency diversity with a single power amplifier and a single antenna having a single feed system;

(b) said transmitting means including pulse code modulating encoding and multiplexing means for converting audio and data signals into a time-division multiplexed serial binary bit stream and code converter means for converting said serial binary bit stream into redundant frequency-time coded signals for transmisison over a troposcatter communication link;

(c) receiving means for the reception of radio frequency signals, said receiving means being adapted to detect multiple order frequency diversity signals using a single antenna with a single antenna feed system and a single radio receiver;

(d) said receiving means including decoder means adapted to convert a received serial stream of redundant frequency-time coded signals into a serial binary bit stream; and pulse code demodulating and demultiplexing means to demodulating and demultiplexing said serial binary bit stream into intelligence bearing audio and data signals.

11. The communication system according to claim 10 in which said code converter means converts said serial binary bit stream into a serial octal bit stream and said serial octal bit stream into redundant frequency-time coded signals.

12. The communication system according to claim 10 in which said code converter means converts said serial binary bit stream into a serial 4-ary bit stream and said serial 4-ary bit stream into redundant frequency-time coded signals.

13. The communication system according to claim 10 in which said code converter means converts said serial binary bit stream into serial 16-ary bit stream and said serial 16-ary bit stream into redundant frequency-time coded signals.

14. The communication system according to claim 10 in which said code converter means includes a plurality of gated oscillators for producing radio-frequency bursts separated in frequency by a sufficient magnitude to insure frequency diversity over fading troposcatter communication paths.

15. A scatter propagation communication system for diversity type transmission and reception of radio frequency energy comprising in combination:

(a) code converter means for converting a serial binary bit stream into a serial stream of redundant frequency-time codes consisting of a matrix of a plurality of short bursts of different frequencies in a plurality of successive time positions;

(b) transmission means coupled to said code converter means for the transmission of said redundant frequency-time codes over a troposcatter medium, said transmission means having a single power amplifier and a single antenna having a single feed system;

(c) receiver means for the reception of said transmitted frequency-time codes; and (d) decoder means coupled to said receiver means for converting said frequency-time codes to a serial binary bit stream.

16. The communication system according to claim 15 in which said code converter means converts said serial binary bit stream to an *m*-ary stream of redundant frequency-time codes.

17. The communication system according to claim 15 in which said decoder means identifies said redundant frequency-time codes by comparing all available codes and selecting the most likely F–T code.

18. The communication system according to claim 17 in which said decoder means selects the most likely frequency-time code by detecting the code elements of each code, summing the energies of said code elements, comparing the total energies of said summed code elements, and selecting the code having the greatest energy.

19. A method for beyond-the-horizon communication by means of scatter propagation in a tropospheric mode comprising the steps of:

(a) converting a serial binary bit stream into redundant frequency-time coded signals consisting of a matrix of a plurality of short bursts of different frequencies in a plurality of successive time positions;

(b) transmitting said redundant frequency-time coded signals over a troposcatter communication link;

(c) receiving said transmitted redundant frequency-time coded signals; and (d) decoding said redundant frequency-time coded signals into a serial binary stream of pulse code modulated signals.

20. The method according to claim 19 in which said step of decoding said redundant frequency-time coded signals into a serial binary bit stream first identifies said redundant frequency-time codes by comparing all available codes and selecting the most likely frequency-time code.

21. A scatter propagation communication system for diversity type transmission and reception of intelligence bearing radio frequency energy comprising:

(a) transmitting means for the transmission of radio frequency signals, said transmitting means being adapted to produce multiple order frequency diversity with a single power amplifier and a single antenna having a single feed system;

(b) said transmitting means including converter means for converting a serial binary bit stream into redundand frequency-time coded signals for transmission over a troposcatter communication link; and (c) receiving means for the reception of radio frequency signals; said receiving means being adapted to detect multiple order frequency diversity signals using a single antenna with a single antenna feed system and a single radio receiver;

(d) said receiving means including decoder means adapted to convert a received serial stream of redundant frequency-time coded signals into a serial binary bit stream.

22. The communication system according to claim 21 in which said converter means converts said serial binary bit stream into a serial octal bit stream and said serial octal bit stream into redundant frequency-time coded signals.

23. The communication system according to claim 21 in which said converter means converts said serial binary bit stream into a serial 4-ary bit stream and said serial 4-ary bit stream into redundant frequency-time coded signals.

24. The communication system according to claim 21 in which said converter means converts said serial binary bit stream into serial 16-ary bit stream and said serial 16-ary bit stream into redundant frequency-time coded signals.

25. A system for scatter propagation of digital information comprising: means to convert the digital information into a time sequential series of frequency-time codes, each said code comprising the unique arrangement of a finite and limited group of frequencies in separate time slots within an over-all code time interval, each said code being redundant so that each said code may be identified by knowledge of the existence and corresponding time slot positions of less than the total number of frequencies making up each code; and time division multiplex means for transmitting the plurality of time sequential series of frequency-time codes corresponding to the plurality of channels.

26. A system for scatter propagation of the information contained in a plurality of channels comprising: means to convert the information in each channel into a serial bit stream and thence into a time sequential series of frequency-time codes, each said code comprising the unique arrangement of a finite and limited group of frequencies in separate time slots with an over-all code time interval, each said code being redundant so that each said code may be identified by knowledge of the existence and corresponding time slot positions of less than the total number of frequencies making up each code; and time division multiplex means for transmitting the plurality of time sequential series of frequency-time codes corresponding to the plurality of channels.

27. The system as defined in claim 26 in which said channels are PCM channels.

28. A system for scatter propagation of digital information comprising: means for defining the information in terms of a time sequential series of groups, each group containing the same number of bits of information, with the number of different groups being limited; means for assigning an identifying frequency-time code to each different group, so that the information in each channel is contained in a time sequential series of frequency-time codes, each said code comprising the unique arrangement of a finite and limited group of frequencies in separate time slots within an over-call code time interval, and each said code being redundant so that each code may be identified by knowledge of the existence and time slot positions of less than the total number of frequencies making up each code; and means for transmitting the plurality of time sequential series of frequency-time codes corresponding to the digital information.

29. A system for scatter propagation of the information contained in a plurality of channels comprising: means for defining the information in each channel in terms of a time sequential series of groups, each group containing the same number of bits of information, with the number of different groups being limited; means for assigning an identifying frequency-time code to each different group, so that the information each channel is contained in a time sequential series of frequency-time codes, each said code comprising the unique arrangement of a finite and limited group of frequencies in separate time slots within an over-all code time interval, and each said code being redundant so that each code may be identified by knowledge of the existence and time slot positions of less than the total number of frequencies making up each code; and time division multiplex means for transmitting the plurality of time sequential series of frequency-time codes corresponding to the plurality of channels.

30. The system as defined in claim 29 in which said channels are PCM channels.

31. A system for scatter propagation of the information contained in a plurality of analog channels comprising means for periodically sampling the value of one parameter of the analog signal in each channel; means for converting the approximate periodically sampled parameter values in each channel to a time sequential stream of binary bits; means for assigning an identifying frequency-time code to each of successive groups of said binary bits, with a different code being assigned to each different group, so that the information in each channel is contained in a time sequential series of frequency-time codes, each said code comprising the unique arrangement of a finite and limited group of frequencies in separate time slots within an over-all code time interval, and each said code being redundant so that each said code may be identified by knowledge of the existence and corresponding time slot positions of less than the total number of frequencies making up each code; and time division multiplex means for transmitting the plurality of time sequential series of frequency-time codes corresponding to the plurality of channels.

32. The system as defined in claim 31 in which said analog channels are voice or telephone channels.

References Cited

UNITED STATES PATENTS

| | | | |
|---|---|---|---|
| 2,895,128 | 7/1959 | Bryden | 325—56 |
| 3,037,190 | 5/1962 | Herbst | 179—15 |
| 3,150,374 | 9/1964 | Sunstein et al. | 325—56 XR |
| 3,239,761 | 3/1966 | Goode | 325—55 XR |
| 3,292,178 | 12/1966 | Magnuski | 343—203 |
| 3,370,128 | 2/1968 | Morita et al. | 179—15 |

ROBERT L. GRIFFIN, Primary Examiner

C. R. VON HELLENS, Assistant Examiner

U.S. Cl. X.R.

179—15; 325—40, 145, 154